United States Patent Office.

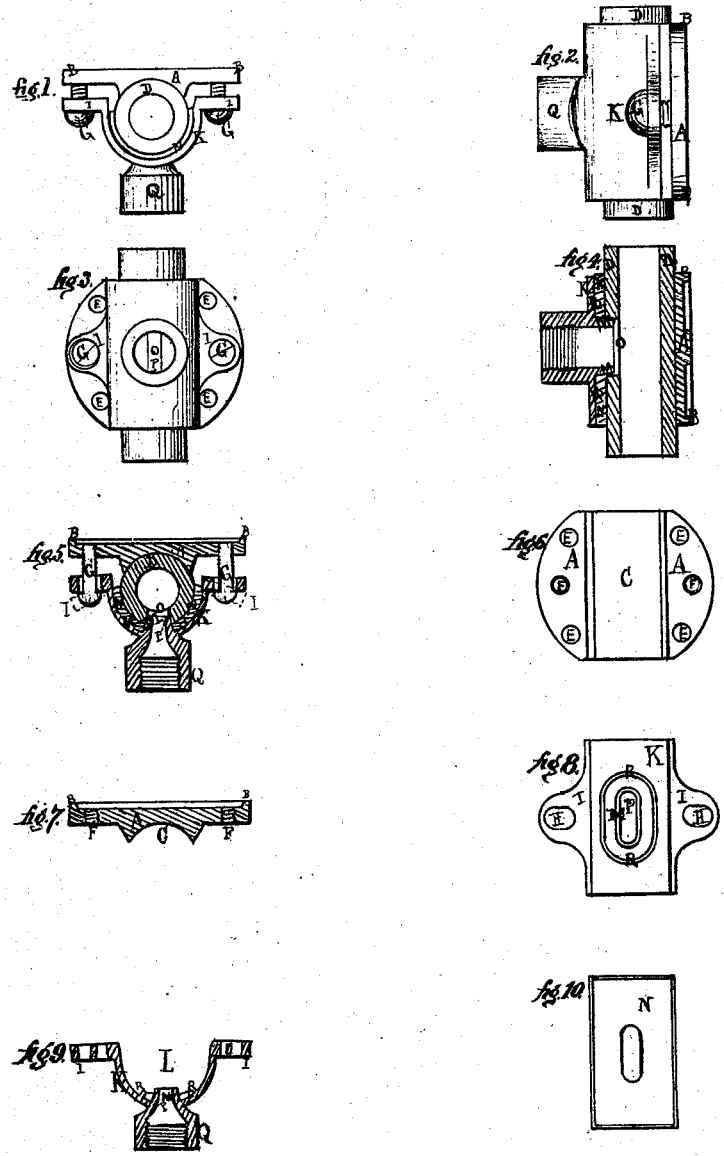

JOSIAH S. CLARK, OF PHILADELPHIA, PENNSYLVANIA.

Letters Patent No. 105,907, dated August 2, 1870.

IMPROVEMENT IN BRANCH ATTACHMENT FOR WATER-TUBES.

The Schedule referred to in these Letters Patent and making part of the same.

*To all whom it may concern:*

Be it known that I, JOSIAH S. CLARK, of the city and county of Philadelphia and State of Pennsylvania, have invented a new and useful Device for Making Connections of Lateral Branches to Pipes for Conveying Fluids; and I do hereby declare the following to be a full, clear, and exact description thereof, reference being had to the accompanying drawing and letters of reference marked thereon.

The nature of my invention consists in so constructing a clamp, with a suitable outlet for attaching pipes or cocks, as to securely hold a tight joint upon the pipe to which it is applied, and at the same time avoiding any diminution in the strength of the tube at the place of attachment, the whole being so constructed as to be easily applicable, by persons of moderate mechanical ability, to pipes which may be somewhat irregular in the form of their external surfaces.

The precise mode of making and using this invention is hereinafter explicitly described, and shown in the several figures referred to in this specification.

The same letters of reference apply to the same parts in the several figures.

Figure 1 shows a plan of this invention, as applied to a vertical water-pipe;

Figure 2 shows a side elevation;

Figure 3 shows a front elevation;

Figure 4 shows a vertical section;

Figure 5 shows a horizontal section;

Figure 6 shows the back or rigid clamp in elevation;

Figure 7 shows the back clamp in horizontal section;

Figure 8 shows the front or flexible clamp in elevation;

Figure 9 shows the front clamp in horizontal section; and

Figure 10 shows the packing or gasket.

The back clamp A is made rigid by means of a rim, B, formed on the back of it, and is grooved on the front vertically at C, so as to receive and support the back of the pipe D.

There are suitable holes E E E E formed in the flanges of the clamp A, through which screws or nails may be used to secure it to a wall or other support, and two or more other holes, F F, are made in it, and provided with screw-threads, into which are screwed the bolts or screws G G, which pass through the slot-holes H H in the flanges I I of the front or flexible clamp K.

The flanges I I are thicker than the metal between them and the neck Q, hereinafter described.

The front or flexible clamp K is made of ductile or flexible metal, and grooved at L, so as to fit approximately over the pipe D, and has in the center of it a slot, P, parallel with the the groove L, which slot P has a rim, M, raised around it in the groove L, sufficient in height to extend, through the gasket N, into the aperture O in the pipe D.

Upon the outer side of the clamp K is formed a short tube or neck, Q, screwed either internally or externally, or both, for the attachment of pipes or stop-cocks, and made flat at the point of attachment to the clamp K, so as not to stiffen the clamp K at that point.

At a little distance from, and parallel with, the rim M, I form a little ridge, R, which, by indenting the packing or gasket N, renders a tight joint almost inevitable.

This short tube or neck Q communicates, through the slot P and aperture O, with the interior of the pipe D.

In applying this invention to a pipe already erected, I place behind the pipe the rigid clamp A, and secure it in position by nailing or screwing it in such position that the pipe D lies fairly in the groove C.

I next, with suitable implements, cut a slot in the front of the pipe D, of such size as to permit the rim M to fit in it. Then, after placing the gasket N around the rim M, I apply the clamp K to the pipe, so that the groove L fits over the pipe, and the rim M fits into the aperture O, and then insert the screws G G, through the slot-holes H H in the flanges of the clamp K, into the holes F F.

I tighten the screws until the gasket N is applied closely to the pipe, and the clamp K, being of flexible material, adapts itself to the form of the pipe D.

The rim M prevents the pressure employed in clamping the pipe D from collapsing the aperture O in the pipe, and is also useful in retaining the gasket N in position when applying the clamp K to the pipe.

The advantages obtained in the use of this invention, as compared with other known modes of making lateral branches to water-pipes, are, that less preparation is requisite to apply this apparatus; that very little skill is required in using it; the strength of the pipe is unimpaired at the place of the attachment, and the clamp K, by reason of its flexibility, adapts itself to any slight variations in size or shape of the pipe D.

The flanges I I are inclined forward, as shown in dotted lines in fig. 5, before the screws G G are drawn up.

The slot-holes H H facilitate the bending of the clamp K.

I am aware that several devices, consisting of rigid clamp-boxes, have been used for making lateral attachments to pipes. These, therefore, I distinctly disclaim; but

What I claim as my invention, and desire to secure as such by Letters Patent, is—

The pair of flanged boxes or clamps, one of which is rigid and practically inflexible, and the other flexible, with a flattened tubulare or neck formed on it, the whole being applied with a gasket, and secured by screws to a tube, as shown and described.

JOSIAH S. CLARK.

Witnesses:
WALTER J. BUDD,
J. P. DELANEY.